United States Patent
Park et al.

(10) Patent No.: US 12,086,695 B2
(45) Date of Patent: Sep. 10, 2024

(54) SYSTEM AND METHOD FOR TRAINING A MULTI-TASK MODEL

(71) Applicant: Toyota Research Institute, Inc., Los Altos, CA (US)

(72) Inventors: Dennis Park, Fremont, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 847 days.

(21) Appl. No.: 17/205,709

(22) Filed: Mar. 18, 2021

(65) Prior Publication Data

US 2022/0300851 A1   Sep. 22, 2022

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
CPC ............ G06N 20/00; G06N 5/04; G06N 3/08; G06V 10/774; G06V 10/82; G06V 20/56
See application file for complete search history.

(56) References Cited

U.S. PATENT DOCUMENTS 10,643,320 B2    5/2020  Lee et al.
2019/0147298 A1*  5/2019  Rabinovich ........... G06F 18/217
                                                          382/157

OTHER PUBLICATIONS

Kendall, Alex, Yarin Gal, and Roberto Cipolla. "Multi-task learning using uncertainty to weigh losses for scene geometry and semantics." Proceedings of the IEEE conference on computer vision and pattern recognition. 2018. (Year: 2018).*
Yu, Tianhe, et al. "Gradient surgery for multi-task learning." Advances in Neural Information Processing Systems 33 (2020): 5824-5836. (Year: 2020).*
Talwar, Deepak, et al. "Evaluating validity of synthetic data in perception tasks for autonomous vehicles." 2020 IEEE International Conference on Artificial Intelligence Testing (AITest). IEEE, 2020. (Year: 2020).*
Suteu, Mihai, and Yike Guo. "Regularizing deep multi-task networks using orthogonal gradients." arXiv preprint arXiv:1912.06844 (2019). (Year: 2019).*

(Continued)

*Primary Examiner* — Michael J Huntley
*Assistant Examiner* — Nicholas S Wu
(74) *Attorney, Agent, or Firm* — Christopher G. Darrow; Darrow Mustafa PC

(57) ABSTRACT

A system for training a multi-task model includes a processor and a memory in communication with the processor. The memory has a multi-task training module having instructions that, when executed by the processor, causes the processor to provide simulation training data having a plurality of samples to a multi-task model capable of performing at least a first task and a second task using at least one shared. The training module further causes the processor to determine a first value (gradience or loss) for the first task and a second value (gradience or loss) for a second task using the simulation training data and the at least one shared parameter, determine a task induced variance between the first value and the second value, and iteratively adjust the at least one shared parameter to reduce the task induced variance.

17 Claims, 5 Drawing Sheets

(56) References Cited

OTHER PUBLICATIONS

Bai, Lu, et al. "Multi-task gradient descent for multi-task learning." Memetic Computing 12 (2020): 355-369. (Year: 2020).*
Kanakis et al., "Reparameterizing Convolutions for Incremental Multi-Task Learning without Task Interference," 22 pages, arXiv:2007.12540v1 [cs.CV] Jul. 24, 2020.
Lee et al., "Spigan: Privileged Adversarial Learning from Simulation," 14 pages, arXiv:1810.03756v3 [cs.CV] Feb. 18, 2019.
Kendall et al., "Multi-Task Learning Using Uncertainty to Weigh Losses for Scene Geometry and Semantics," 2018 IEEE/CVF Conference on Computer Vision and Pattern Recognition, pp. 7482-7491 (2018).
Chen et al., "GradNorm: Gradient Normalization for Adaptive Loss Balancing in Deep Multitask Networks," International Conference on Machine Learning, pp. 794-803. PMLR (2018).
Kingma et al., "Adam: A Method for Stochastic Optimization," 15 pages, arXiv:1412.6980v9 [cs.LG] Jan. 30, 2017.
Duchi et al., "Adaptive Subgradient Methods for Online Learning and Stochastic Optimization," Journal of Machine Learning Research 12, No. 7, pp. 2121-2159, (2011).
Vandenhende et al., "Multi-Task Learning for Dense Prediction Tasks: A Survey," pp. 1-20, arXiv:2004.13379v3 [cs.CV] Jan. 24, 2021.

\* cited by examiner

SYSTEM AND METHOD FOR TRAINING A MULTI-TASK MODEL

TECHNICAL FIELD

The subject matter described herein relates, in general, to systems and methods for training a multi-task model.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Machine learning generally focuses on optimizing a particular metric performed by a model. For single task models, these models are trained to perform the desired task. During the training of the single task model, one or more task specific parameters are adjusted until the performance of the single task model no longer improves.

Multi-task models can perform multiple tasks at the same time and can exploit commonalities and differences across tasks. This may result in improved learning efficiency and prediction accuracy for the task specific models when compared to training the model separately. Nevertheless, the training of these multi-task models has its own set of problems. Moreover, in some cases, the optimization of one of the tasks of the multi-task model may result in task interference, where the optimization of one task adversely impacts the optimization of other tasks.

SUMMARY

This section generally summarizes the disclosure and is not a comprehensive explanation of its full scope or all its features.

In one embodiment, a system for training a multi-task model includes a processor and a memory in communication with the processor. The memory has a multi-task training module with instructions that, when executed by the processor, causes the processor to provide simulation training data with a plurality of samples to a multi-task model capable of performing at least a first task and a second task using at least one shared parameter. The training module further causes the processor to determine a first value for the first task and a second value for a second task using the simulation training data and the at least one shared parameter. The first value and the second value may be either gradients or loss values. Thereafter, the training module causes the processor to determine a task induced variance between the first value and the second value and iteratively adjust the at least one shared parameter to reduce the task induced variance.

In another embodiment, a method for training a multi-task model includes the steps of providing simulation training data having a plurality of samples to a multi-task model capable of performing at least a first task and a second task using at least one shared parameter, determining a first gradient for the first task using the simulation training data and the at least one shared parameter, determining a second gradient for the second task using the simulation training data and the at least one shared parameter, determining a task induced gradient variance between the first gradient and the second gradient, and iteratively adjusting the at least one shared parameter to reduce the task induced gradient variance.

In yet another embodiment, a method for training a multi-task model includes the steps of providing simulation training data having a plurality of samples to a multi-task model capable of performing at least a first task and a second task using at least one shared parameter, determining a first loss for the first task using the simulation training data and the at least one shared parameter, determining a second loss for the second task using the simulation training data and the at least one shared parameter, determining a task induced variance loss between the first loss and the second loss, and iteratively adjusting the at least one shared parameter to reduce the task induced variance loss.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described is a system and method for training a multi-task model. As explained in the background section, the optimization of one task of a multi-task model may adversely impact the performance of other tasks. This phenomenon is referred to as task interference. The system and method described in this specification can reduce and/or eliminate task interference when training a multi-task model. The system and method train the multi-task model utilizing simulation training data. Simulation training data, sometimes referred to as synthetic data, unlike annotated training data collected from the real world, is complete (all samples have all labels for all tasks) and perfect (no label noise, as labels are algorithmically computed). This enables directly measuring task interference and its various causes to improve multi-task optimization algorithms. The system and method essentially utilize task-induced gradient/loss variance normalization to learn robust multi-task models using the simulation training data.

When training the multi-task model with the simulation data, a first value for the first task of the multi-task model is generated using the simulation training data and at least one shared parameter of the multi-task model. The first value could be a gradient and/or a loss calculated using a loss function. A gradient represents the change in all weights with regard to the change in error. A loss is a penalty for a bad prediction. Using the simulation training data at the same moment in time and the one or more shared parameters, a second value for the second task of the multi-task model is generated. Like before, the second value may be a gradient or loss computed using a loss function.

The system and method then determine a task induced variance that is based on the differences between the first value in the second value. The task-induced variance may compare the different gradients between the first and second tasks and/or the different losses between the first and second tasks. Based on the task induced variance, the system and method may iteratively adjust at least one shared parameter to reduce the task induced variance. By reducing the task induced variance, the multi-task model can be trained to perform a multitude of different tasks without incurring task interference. As such, each of the tasks of the multi-task model is optimized such that they achieve peak performance without causing task interference.

Figure 1:
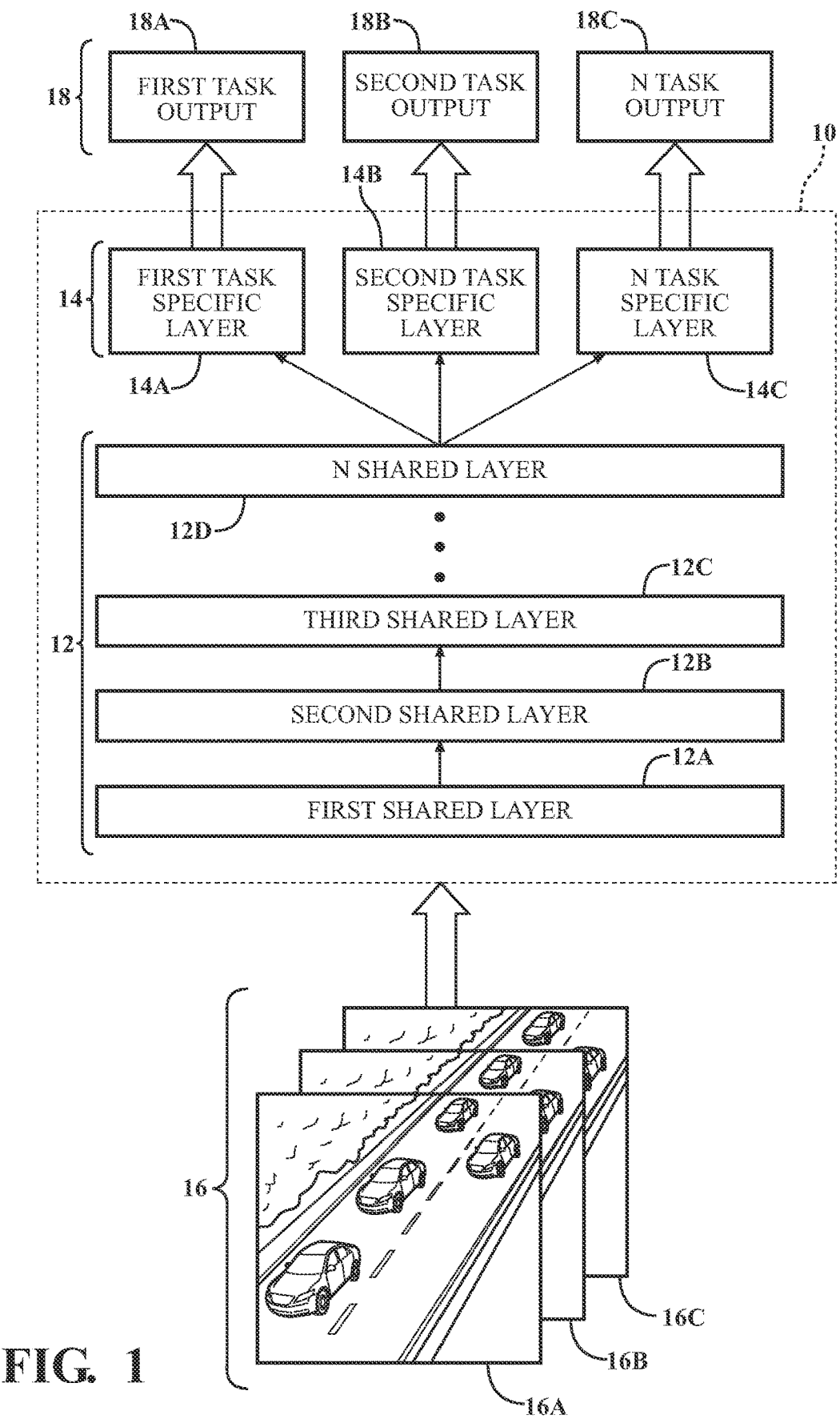
FIG. 1 illustrates one example of a multi-task model.

To better understand the system and method, reference is made to FIG. 1, which illustrates a multi-task 10. It should be understood that the multi-task model 10 of FIG. 1 is just one example of a multi-task model. Different types of multi-task models may also be trained by the system and method described in this specification. At its highest level, the multi-task model 10 can receive input data 16, which can take any one of a number of different forms. For example, the input data 16 could be images, such as images 16A-16C, that may have been captured by one or more sensors, such as a camera sensor. However, the input data 16 could be other types of data as well, such as one or more point clouds captured by a LIDAR sensor, pseudo-LIDAR data generated by performing computations on image data, or any other type of data that a multi-task model may process. Using a series of layers, which will be described later, the multi-task model 10 can output an output layer 18 having one or more task specific outputs 18A-18C.

Here, the multi-task model 10 is illustrated as having a first task output 18A, a second task output 18B, and an N task output 18C. As such, the multi-task model 10 can perform any one of a number of operations to output information related to any one of a number of different tasks. In one example, the first task output 18A could be a depth map for each of the images 16A-16C and the second task output 18B could be bounding boxes that indicate the location of one or more objects found within each of the images 16A-16C. The N task output 18C could also include other information related to the images 16A-16C, such as object tracking information for any objects detected within the images 16A-16C. It should be understood that the one or more outputs of the output layer 18 described above are merely examples and that the one or more outputs of the output layer 18 can relate to any one of a number of different outputs that may be generated by a neural network, including a multi-task model.

The multi-task model 10 may include both shared layers 12 and task specific layers 14. In this example, illustrated is a first shared layer 12A, a second shared layer 12B, a third shared layer 12C, and an N shared layer 12D. Again, the shared layers 12 may include any one of a number of different shared layers and not necessarily be limited to those specifically shown in this example. The one or more shared layers 12 may include a collection of nodes operating together at a specific depth within a neural network, such as the multi-task model 10. In one example, each of the one or more shared layers 12 may be a container that receives a weighted input, transforms the input using a set of functions, such as nonlinear functions, and then pass these values as output to the next layer.

The multi-task model 10 may also include task specific layers 14. Here, illustrated are a first task specific layer 14A, a second task specific layer 14B, and an N task specific layer 14C, that specifically relate to the first task output 18A, the second task output 18B, and the N task output 18C, respectively. Here, illustrated is only one layer of task specific layers 14. However, any number of layers could be utilized. Additionally, the task specific layers 14 are shown to be located nearest the output layer 18, but it should be understood that any of the task specific layers may be embedded between or even before any of the shared layers 12.

Regarding the shared layers 12, the shared layers 12 may have one or more shared parameters. The shared parameters may be the weights of the connections between the nodes that form the shared layers 12. As such, the adjustment of the shared parameters affects the output of each of the task specific outputs 18A-18C. Regarding the task specific layers 14, the task specific layers 14 may have a set of task specific parameters, wherein the adjustment of one of the parameters of a particular task does not affect another task's performance. As such, adjusting a task specific parameter related to the first task specific layer 14A will not impact the performance of the second task specific layer 14B. However, the adjustment of shared parameters regarding the shared layers 12 may impact the output of all the tasks 18A-18C.

Figure 2:
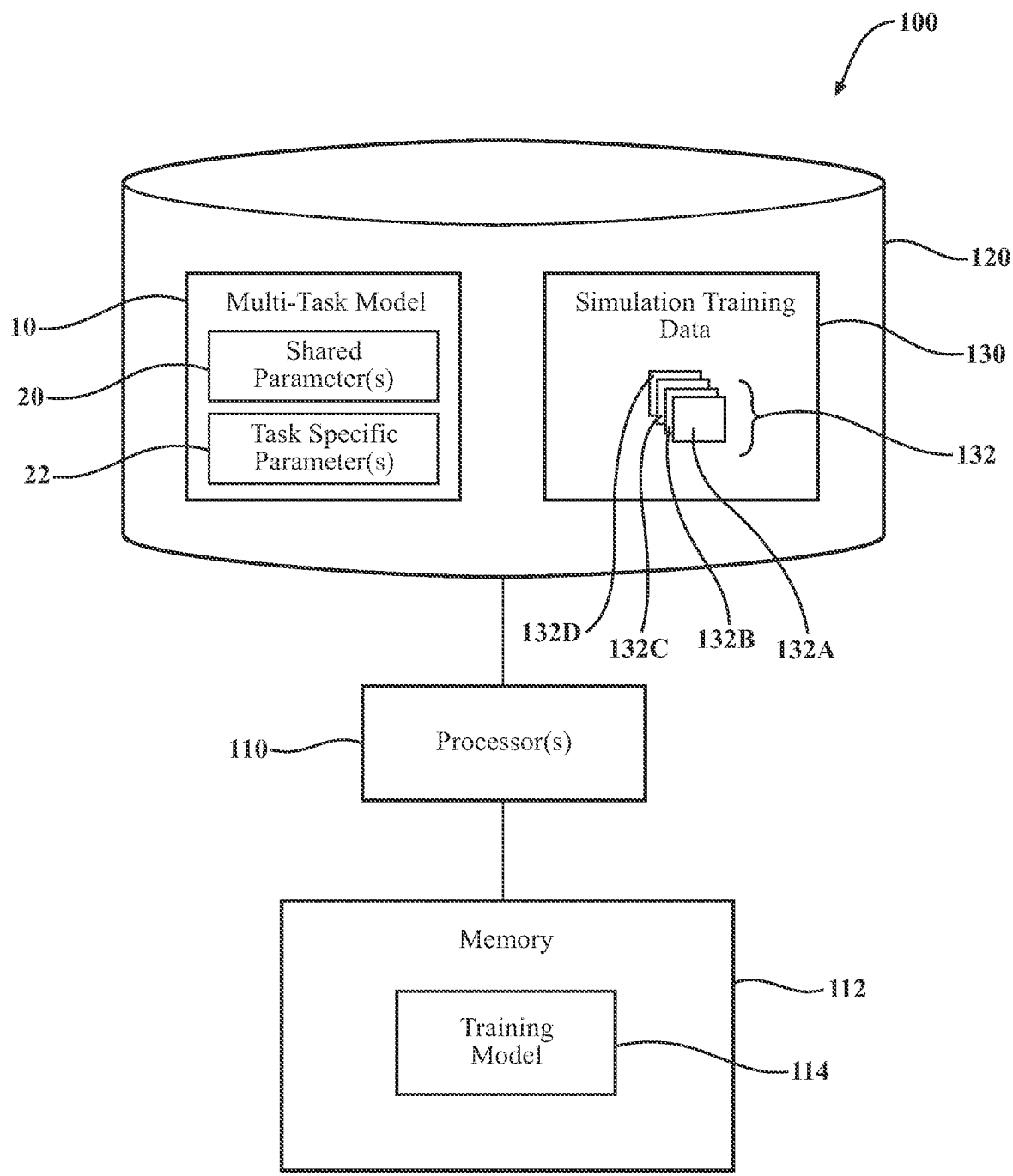
FIG. 2 illustrates one example of a multi-task model training system for training a multi-task model, such as the multi-task model of FIG. 1.

As stated in the background section, some of the difficulty in training a multi-task model, such as the multi-task model 10, is that the optimization of one particular task, such as the first task output 18A, may adversely impact the performance of the second task output 18B. Referring to FIG. 2, illustrated is a multi-task model training system 100 for training a multi-task model, such as the multi-task model 10, that generally reduces and/or eliminates task interference.

As shown, the multi-task model training system 100 includes one or more processor(s) 110. Accordingly, the processor(s) 110 may be a part of the multi-task model training system 100, or the multi-task model training system 100 may access the processor(s) 110 through a data bus or another communication path. In one or more embodiments, the processor(s) 110 is an application-specific integrated circuit that is configured to implement functions associated with a training module 114. In general, the processor(s) 110 is an electronic processor such as a microprocessor capable of performing various functions as described herein.

In one embodiment, the multi-task model training system 100 includes a memory 112 that stores the training module 114. The memory 112 is a random-access memory (RAM), read-only memory (ROM), a hard disk drive, a flash memory, or other suitable memory for storing the training module 114.

The training module 114 is, for example, computer-readable instructions that, when executed by the processor(s) 110, cause the processor(s) 110 to perform the various functions disclosed herein. The training module 114 can be implemented as computer-readable program code that, when executed by a processor(s) 110, implement one or more of the various processes described herein. The training module 114 can be a component of the processor(s) 110, or the training module 114 can be executed on and/or distributed among other processing systems to which the processor(s) 110 is operatively connected. The training module 114 can include instructions (e.g., program logic) executable by one or more processor(s) 110.

Furthermore, in one embodiment, the multi-task model training system 100 includes one or more data store(s) 120. The data store(s) 120 is, in one embodiment, an electronic data structure such as a database that is stored in the memory 112 or another memory and that is configured with routines that can be executed by the processor(s) 110 for analyzing stored data, providing stored data, organizing stored data, and so on. Thus, in one embodiment, the data store(s) 120 stores data used by the training module 114 in executing various functions. In one embodiment, the data store(s) 120 includes the multi-task model 10 and simulation training data 130 for training the multi-task model 10. The multi-task model 10 may include one or more shared parameters 20 that impact the performance of shared layers, such as the shared layers 12 of FIG. 1 and task specific parameters 22 that may impact the performance of task specific layers, such as the task specific layers 14 of FIG. 1.

The simulation training data 130 may include a plurality of samples 132 for training the multi-task model 10. In this example, the samples 132 include four samples 132A-132D; however, the samples 132 can include any number of samples. The samples 132 may be simulated images, point clouds, or other simulated data structures that may mimic real-world data that may be generated based on information received by a sensor, such as a camera sensor, LIDAR sensor, and the like. The samples 132 include ground-truth information that is complete and generally perfect.

Moreover, the samples 132 may be complete in the sense that the ground truth information includes labels for each of the tasks to be performed by the multi-task model 10. For example, each of the samples 132A-132D were taken at a particular or common moment in time. The samples 132A-132D may be sequential or nonsequential. However, for each sample 132A-132D, ground truth information is provided to each of the tasks of the multi-task model 10. As will be explained in this specification, having ground truth information for each of the tasks of the multi-task model 10 for each of the samples 132A-132D at a common moment in time enables direct measurement of task interference and its various causes to improve the performance of the multi-task model 10.

Figure 3:
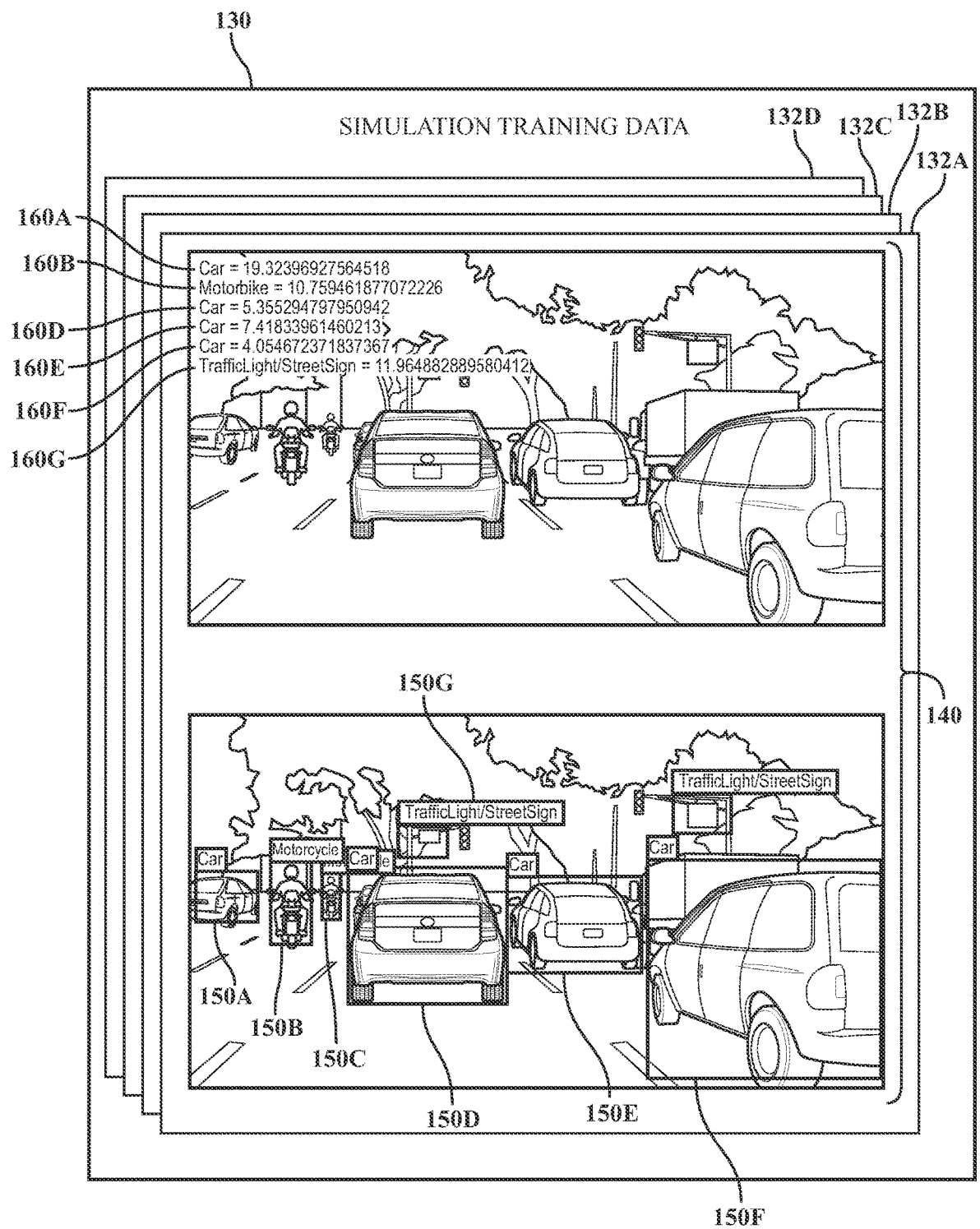
FIG. 3 illustrates one example of simulation training data used to train a multi-task model, such as the multi-task model of FIG. 1.

For example, referring to FIG. 3, illustrated is the simulation training data 130 that include the samples 132A-132D. In this example, the samples 132A-132D are simulated images similar to those captured by a camera sensor, such as a camera sensor mounted to a vehicle. In this example, details regarding the sample 132A are illustrated, but the description is equally applicable to the other samples 132B-132D.

The sample 132A includes ground truth information 140. The ground truth information 140 may include information regarding the presence of objects and object type, as indicated as bounding boxes 150A-150G and ground truth distance information 160A-160G. As such, the multi-task model 10 may have a first task that relates to determining the presence of objects, a second task for determining object type, and a third task that relates to generating a depth map. The ground truth information 140 for the sample 132A is complete in the sense that it includes the information that should be determined by the multi-task model 10, in this case, information regarding the presence of objects, object types, and their locations.

As will be explained in this specification, a particular sample, such as the sample 132A, will be provided to the multi-task model 10, and outputs from the tasks of the multi-task model 10 will be evaluated to determine the loss using a loss function and/or gradient. The loss and/or the gradient is determined for each of the tasks of the multi-task model 10 using a particular sample, such as the sample 132A.

Prior art solutions generally train one task of a multi-task model using a training data set that is completely unrelated to another training data set to train another task. For example, the training of a task for a multi-task model related to object detection may use one training data set, while the training of another task of the same multi-task model related to generating a depth map may use a completely different training data set. The multi-task model training system 100 uses simulation training data 130 that is complete and includes ground truths for training a plurality of tasks, or even all tasks, of a multi-task model.

Referring back to FIG. 2, the training module 114 includes instructions that cause the processor(s) 110 to train the multi-task model 10 using the simulation training data 130. Here, the training module 114 includes instructions that cause the processor(s) 110 to receive or otherwise obtain the simulation training data 130, including a plurality of samples 132. The training module 114 includes instructions that cause the processor(s) 110 to provide the samples 132 of the simulation training data 130 to the multi-task model 10.

The training module 114 also includes instructions that cause the processor(s) 110 to determine a first value—either a first gradient and/or a first loss based on the loss function—for the first task of the multi-task model 10 using the simulation training data 130 and at least one shared parameter 20. As explained previously, the simulation training data 130 includes a plurality of samples 132 that include ground truth information. Similarly, the training module 114 also includes instructions that cause the processor(s) 110 to determine a second value—either a second gradient and/or a second loss based on the loss function—for the second task of the multi-task model 10 using a sample of the simulation training data 130 and at least one shared parameter 20. In this example, the multi-task model 10 includes two tasks. However, if the multi-task model 10 includes more than two tasks, the training module 114 would cause the processor(s) 110 to continue determining values for each of the tasks of the multi-task model 10.

The training module 114 also includes instructions that cause the processor(s) 110 to determine a task induced variance between the first value and the second value. In one example, the task induced variance, referred to as a task induced gradient variance, when the first and second values are gradients, may be estimated for each sample n of the samples 132 of the simulation training data 130 as:

$$v_n(K) = \text{Var}[g_{n,1:K}] = \frac{1}{K}\sum_{k=1}^{K} g_{n,k}^2 - \left(\sum_{k=1}^{K} g_{n,k}\right)^2$$

where, n is a number of samples and g is a gradient.

The task induced gradient variance quantifies the true task interference at the parameter-level, thus enabling to reinforce weight updates for shareable weights of the shared parameters 20 (with low task variance) while downplaying task-specific weights of the task specific parameters 22 (with high task variance). Using this information, the training module 114 causes the processor(s) 110 to iteratively adjust the shared parameters 20 to reduce the task induced gradient variance.

As such, the minimizing of task interference can be implemented by a task variance reduction. Here, the training module 114 causes the processor(s) 110 to iteratively derive additive updates to the shared parameters 20 using the following:

$$g_{n,k} = \nabla_\theta L_k(x_n, y_n; \theta),$$

$$g = \nabla_\theta L = \frac{1}{N \times K} \sum_{n=1}^{N} \sum_{k=1}^{K} \alpha_k \bar{g}_{n,k}, \text{ and}$$

$$\theta^{(t+1)} = \theta^{(t)} - \eta^{(t)} g^{(t)},$$

where $$\bar{g}_{n,k} = \frac{1}{\sqrt{v_n(K)}} g_{n,k},$$

$\{(x_n, y_n)\}$ are the plurality of samples, $\theta$ is the shared parameter, $\alpha$ is a task specific parameter or fixed parameter, and g is a batch level gradient.

This variance reduction scheme may help with sample efficiency (acceleration of convergence) for high-parameter-sharing scenarios (e.g., small models).

In situations where the first value is a first loss and the second value is a second loss, the training module 114 may cause the processor(s) 110 to determine the task induced variance $v_n(L)$ as:

$$v_n(L) = \text{Var}[\{\alpha_k L_k(x_n, y_n), k=1: K\}],$$

where $\{(x_n, y_n)\}$ are the plurality of samples, and L is the loss.

This variance quantifies the task interference at the image level. It also relates to uncertainty, but it is heteroscedastic (i.e., data-dependent). Therefore, it can be used to implement an automatic curriculum: images for which tasks are aligned should contribute a more significant update to the shared weights $\theta$, which can be attained by scaling the corresponding gradient by $v^{-1/2}$. Note that this is complementary to homoscedastic uncertainty, as it can be combined with the task-specific weights $\alpha_k$.

Putting together the task variance reduction with the heterodescastic curriculum, the learning rule may be updated as follows:

$$\theta^{(t+1)} = \theta^{(t)} - \eta^{(t)} \hat{g}^{(t)}$$

$$\hat{g}^{(t)} = \frac{1}{NK} \sum_{n=1}^{N} \frac{1}{\sqrt{v_n^{(t)}(L) \cdot v_n^{(t)}(K)}} \sum_{k=1}^{K} \alpha_k g_{n,k}^{(t)}.$$

The update to the equation in the paragraph above may be potentially expensive to compute for multi-task models with many parameters, requiring either an additional (N; K; d)-dimensional tensor for all the $g_{n;k}$ gradients or online computation of $v_n(K)$ sequentially across batch images and tasks. As an alternative, $\hat{g}$ could be replaced with batch-level statistics instead of image-level, corresponding to a re-weighting of the batch-level gradient g.

As such, the training module 114 may cause the processor(s) 110 to reweigh, when the first value is the first gradient and the second value is the second gradient, the batch level gradient (g) using the following:

$$\hat{g}^{(t)} = \frac{1}{\sqrt{E[v_n^{(t)}(L)]E[v_n^{(t)}(K)]}} g^{(t)}$$

where $E[v_n^{(t)}(L)] = \frac{1}{NK} \sum_{n,k} (\alpha_k L_k(x_n, y_n))^2 - L^2$, and where $E[v_n^{(t)}(K)] = \frac{1}{NK} \sum_{n,k} g_{n,k}^2 - \frac{1}{NK} \sum_n \left(\sum_k g_{n,k}\right)^2$.

This approximation may be valid when images in the batch have similar task interference patterns. Moreover, individual variances $v_n(L)$ and $v_n(K)$ are being replaced by their expectation. This ignores batch-level variance for these quantities. However, as $v_n(L)$ and $v_n(K)$ correspond already to variances, their variance corresponds to fourth-order moments (kurtosis) of the loss and task-specific gradients, respectively. These are negligible in practice by ensuring the losses are normalized between [0; 1] and gradient clipping to [−1; 1]. Nonetheless, the update in the equation in the paragraph directly above might be more conservative, as to not able to leverage high kurtosis due to particularly low variance for specific images, which, together with the aforementioned mitigation, can be mitigated in practice by appropriate task-specific weights $\alpha_k$ and learning rate schedule $\eta^{(t)}$.

This simpler update rule can be computed efficiently as:

$$E[v_n^{(t)}(L)] = \frac{1}{NK} \sum_{n,k} (\alpha_k L_k(x_n, y_n))^2 - L^2$$

$$E[v_n^{(t)}(K)] = \frac{1}{NK} \sum_{n,k} g_{n,k}^2 - \frac{1}{NK} \sum_n \left(\sum_k g_{n,k}\right)^2.$$

As such, the multi-task model training system 100 leverages fine-grained task interference to automatically adapt stochastic gradient updates of multi-task objectives of the multi-task model 10. When applied to training models, such as the multi-task model 10 on completely and perfectly labeled synthetic data, the multi-task model training system 100 effectively maximizes shared parameter learning by minimizing task interference, yielding more robust features, which in turn leads to better generalization across both tasks and domains, including for simulation to real transfer.

Figure 4:
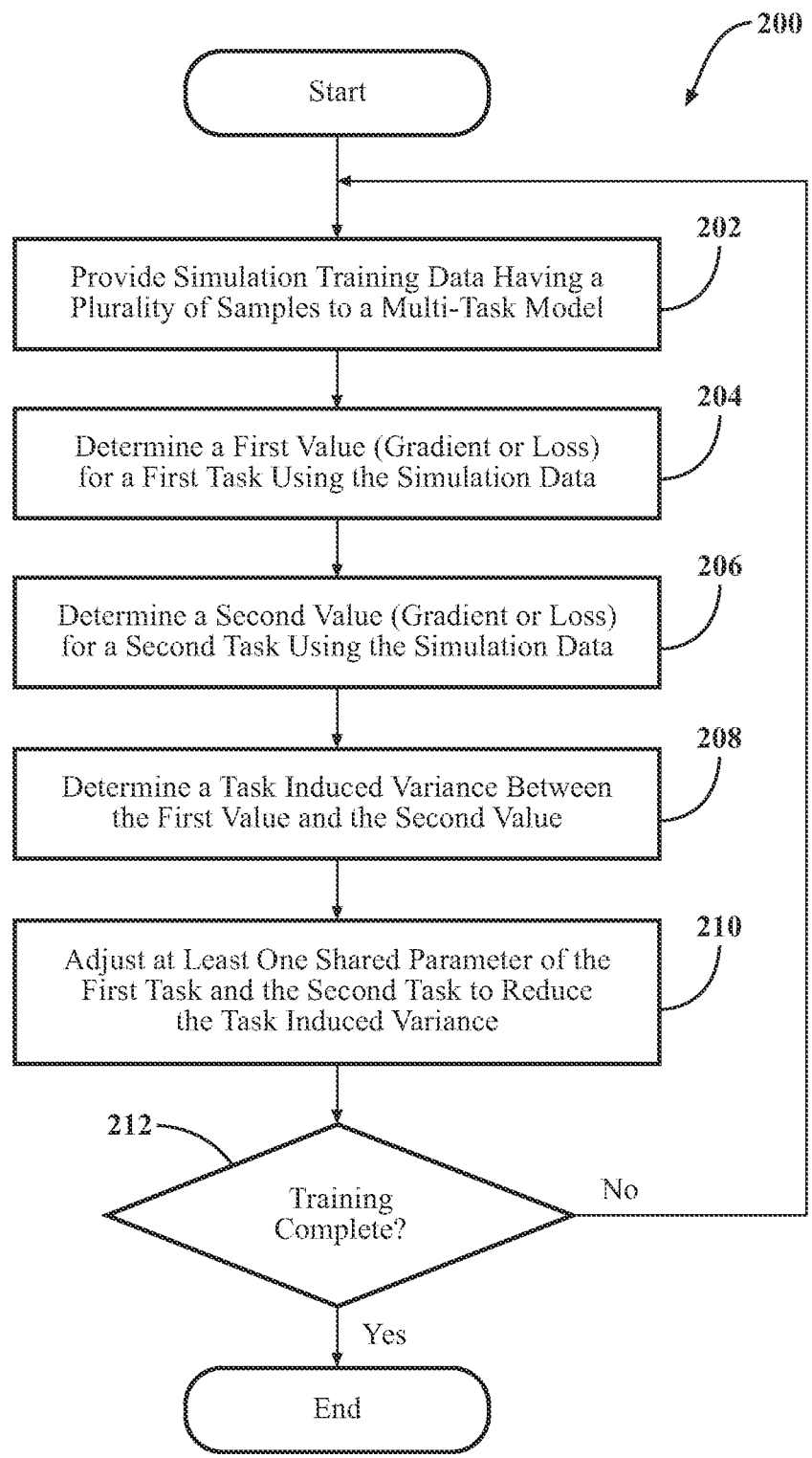
FIG. 4 illustrates a method for training a multi-task model.

Referring to FIG. 4, a method 200 for training a multi-task model is illustrated. The method 200 will be described from the multi-task model training system 100 of FIG. 2. However, it should be understood that this is just one example of implementing the method 200. While the method 200 is discussed in combination with the multi-task model training system 100, it should be appreciated that the method 200 is not limited to being implemented within the multi-task model training system 100 but is instead one example of a system that may implement the method 200.

In step 202, the processor(s) 110 of the multi-task model training system 100 may be provided or may otherwise obtain simulation training data 130 that includes a plurality of samples 132 for training a multi-task model, such as the multi-task model 10 of FIG. 1. As explained previously, the simulation training data 130 includes a plurality of samples 132 for training the multi-task model 10. The samples 132 may be simulated images, point clouds, or other simulated data structures that may mimic real-world data that may be generated from information received by a sensor, such as a camera sensor, LIDAR sensor, and the like. The samples 132 include ground-truth information that is complete in the sense that the ground truth information includes labels for each of the tasks to be performed by the multi-task model 10.

In step 204, the training module 114 may cause the processor(s) 110 to determine a first value—either a first gradient and/or a first loss based on the loss function—for the first task of the multi-task model 10 using the simulation training data 130 and at least one shared parameter 20. Similarly, as shown in step 206, the training module 114 also includes instructions that cause the processor(s) 110 to determine a second value—either a second gradient and/or a second loss based on the loss function—for the second task of the multi-task model 10 using a sample of the simulation training data 130 and at least one shared parameter 20. The steps 204 and 206 may be performed sequentially or simultaneously.

In step 208, the training module 114 may cause the processor(s) 110 to determine a task induced variance between the first value and the second value. In one example, the task induced variance may be a task induced gradient variance that quantifies the true task interference at the parameter-level. In another example, the task induced variance may a task induced loss variance that may be the difference between loss values between a first loss of a first task and a second loss of a second task. The first loss and the second loss may be computed using the same or different loss functions. The task induced variance, either being task induced gradient variance or task induced loss variance, can be computed in a number of different ways, as previously described in the paragraphs above. Furthermore, the computation of the task induced variance may be simplified, as also described in the paragraphs above, to make them less computationally expensive.

In step 210, using the task induced variance, the training module 114 causes the processor(s) 110 to iteratively adjust the shared parameters 20 to reduce the task induced variance, which effectively maximizes shared parameter learning by minimizing task interference, yielding more robust features, which in turn leads to better generalization across both tasks and domains, including for simulation to real transfer.

In step 212, the training module 114 causes the processor(s) 110 to determine if training of the multi-task model 10 is complete. This may be determined by determining if all the samples 132 of the simulation training data 130 have been utilized to train the multi-task model 10 and/or if the multi-task model 10 is meeting one or more performance objectives. If training is not complete, the method 200 returns to step 202, otherwise, the method 200 ends.

As stated before, the multi-task model 10 can perform any one of a number of different tasks. In some cases, the multi-task model 10 may perform tasks related to each other, such as object detection, object location, object classification, object tracking, depth map generation, and the like. As such, the multi-task model 10 can be utilized to assist with motion planning of robotic devices and/or vehicles.

Figure 5:
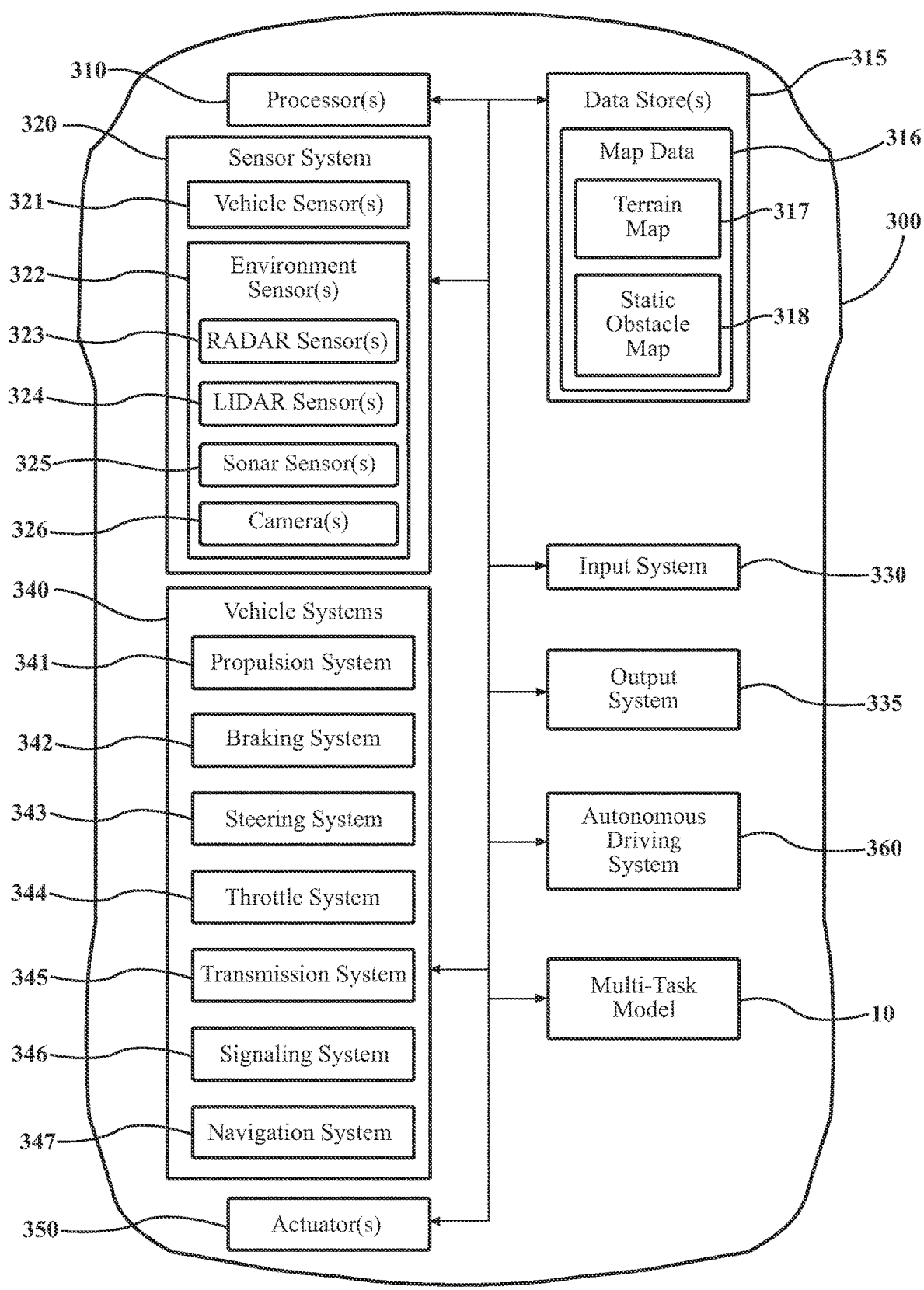
FIG. 5 illustrates an example of a vehicle utilizing a multi-task model trained using the multi-task model training system and/or related method.

In the example shown in FIG. 5, the multi-task model 10 is being used by a vehicle 300. As used herein, a "vehicle" is any form of powered transport. In one or more implementations, the vehicle 300 is an automobile. While arrangements will be described herein with respect to automobiles, it will be understood that embodiments are not limited to automobiles. In some implementations, the vehicle 300 may be any robotic device or form of powered transport that, for example, includes one or more automated or autonomous systems, and thus benefits from the functionality discussed herein.

The vehicle 300 can include an autonomous driving system 360. The autonomous driving system 360 can be configured to receive information from the multi-task model 10 and/or from a sensor system 320 and/or any other type of system capable of processing/capturing information relating to the vehicle 300 and/or the external environment of the vehicle 300. In one or more arrangements, the autonomous driving system 360 can use such data to generate one or more driving scene models. The autonomous driving system 360 can determine the position and velocity of the vehicle 300. The autonomous driving system 360 can determine the location of obstacles, obstacles, or other environmental features, including traffic signs, trees, shrubs, neighboring vehicles, pedestrians, etc.

The autonomous driving system 360 can be configured to determine travel path(s), current autonomous driving maneuvers for the vehicle 300, future autonomous driving maneuvers and/or modifications to current autonomous driving maneuvers based on data acquired by the sensor system 320 and/or provided by the multi-task model 10, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 300, changing travel lanes, merging into a travel lane, and/or reversing, just to name a few possibilities. The autonomous driving system 360 can be configured to implement determined driving maneuvers. The autonomous driving system 360 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 360 can be configured to execute various vehicle functions and/or to transmit data to, receive data from, interact with, and/or control the vehicle 300 or one or more systems thereof (e.g., one or more of vehicle systems 340).

The vehicle 300 also includes various elements. It will be understood that in various embodiments, it may not be necessary for the vehicle 300 to have all of the elements shown in FIG. 5. The vehicle 300 can have any combination of the various elements shown in FIG. 5. Further, the vehicle 300 can have additional elements to those shown in FIG. 5. In some arrangements, the vehicle 300 may be implemented without one or more of the elements shown in FIG. 5. While the various elements are shown as being located within the vehicle 300 in FIG. 5, it will be understood that one or more of these elements can be located external to the vehicle 300. Further, the elements shown may be physically separated by large distances and provided as remote services (e.g., cloud-computing services).

The vehicle 300 can include one or more processor(s) 310. In one or more arrangements, the processor(s) 310 can be a main processor of the vehicle 300. For instance, the processor(s) 310 can be an electronic control unit (ECU). The vehicle 300 can include one or more data store(s) 315 for storing one or more types of data. The data store(s) 315 can include volatile and/or non-volatile memory.

In one or more arrangements, the one or more data store(s) 315 can include map data 316. The map data 316 can include maps of one or more geographic areas. In one or more arrangements, the map data 316 can include one or more terrain map(s) 317. The terrain map(s) 317 can include information about the ground, terrain, roads, surfaces, and/or other features of one or more geographic areas. The map data 316 can include one or more static obstacle maps 318, including information about one or more static obstacles located within one or more geographic areas. A "static obstacle" is a physical object whose position does not change or substantially change over a period of time and/or whose size does not change or substantially change over a period of time.

As noted above, the vehicle 300 can include the sensor system 320. The sensor system 320 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

The sensor system 320 can include any suitable type of sensor. Various examples of different types of sensors will be described herein. However, it will be understood that the embodiments are not limited to the particular sensors described. The sensor system 320 can include one or more vehicle sensor(s) 321. The vehicle sensor(s) 321 can detect, determine, and/or sense information about the vehicle 300 itself. In one or more arrangements, the vehicle sensor(s) 321 can be configured to detect, and/or sense position and orientation changes of the vehicle 300, such as, for example, based on inertial acceleration. In one or more arrangements, the vehicle sensor(s) 321 can include one or more accelerometers, one or more gyroscopes, an inertial measurement unit (IMU), a dead-reckoning system, a global navigation satellite system (GNSS), a global positioning system (GPS), a navigation system 347, and/or other suitable sensors. The vehicle sensor(s) 321 can be configured to detect, and/or sense one or more characteristics of the vehicle 300. In one or more arrangements, the vehicle sensor(s) 321 can include a speedometer to determine a current speed of the vehicle 300.

Alternatively, or in addition, the sensor system 320 can include one or more environment sensors 322 configured to acquire, and/or sense driving environment data. "Driving environment data" includes data or information about the external environment in which an autonomous vehicle is located or one or more portions thereof. For example, the one or more environment sensors 322 can be configured to detect, quantify and/or sense obstacles in at least a portion of the external environment of the vehicle 300 and/or information/data about such obstacles. Such obstacles may be stationary objects and/or dynamic objects. The one or more environment sensors 322 can be configured to detect, measure, quantify and/or sense other things in the external environment of the vehicle 300, such as, for example, lane markers, signs, traffic lights, traffic signs, lane lines, crosswalks, curbs proximate the vehicle 300, off-road objects, etc.

As an example, in one or more arrangements, the sensor system 320 can include one or more radar sensors 323, one or more LIDAR sensors 324, one or more sonar sensors 325, and/or one or more cameras 326. In one or more arrangements, the one or more cameras 326 can be high dynamic range (HDR) cameras or infrared (IR) cameras. The sensor system 320 may provide information to the multi-task model 10, wherein the multi-task model 10 may output information to the autonomous driving system 360, such as object detection information, object location information, object tracking information, depth map information, and the like.

The vehicle 300 can include an input system 330. An "input system" includes any device, component, system, element or arrangement or groups that enable information/data to be entered into a machine. The input system 330 can receive an input from a vehicle passenger (e.g., a driver or a passenger). The vehicle 300 can include an output system 335. An "output system" includes any device, component, or arrangement, or groups thereof that enable information/data to be presented to a vehicle passenger (e.g., a person, a vehicle passenger, etc.).

The vehicle 300 can include one or more vehicle systems 340. Various examples of the one or more vehicle systems 340 are shown in FIG. 5. However, the vehicle 300 can include more, fewer, or different vehicle systems. It should be appreciated that although particular vehicle systems are separately defined, each or any of the systems or portions thereof may be otherwise combined or segregated via hardware and/or software within the vehicle 300. The vehicle 300 can include a propulsion system 341, a braking system 342, a steering system 343, a throttle system 344, a transmission system 345, a signaling system 346, and/or a navigation system 347. Each of these systems can include one or more devices, components, and/or a combination thereof, now known or later developed.

The navigation system 347 can include one or more devices, applications, and/or combinations thereof, now known or later developed, configured to determine the geographic location of the vehicle 300 and/or to determine a travel route for the vehicle 300. The navigation system 347 can include one or more mapping applications to determine a travel route for the vehicle 300. The navigation system 347 can include a global positioning system, a local positioning system, or a geolocation system.

The processor(s) 310 and/or the autonomous driving system 360 can be operatively connected to communicate with the vehicle systems 340 and/or individual components thereof. For example, returning to FIG. 5, the processor(s) 310 and/or the autonomous driving system 360 can be in communication to send and/or receive information from the vehicle systems 340 to control the movement, speed, maneuvering, heading, direction, etc. of the vehicle 300. The processor(s) 310 and/or the autonomous driving system 360 may control some or all of these vehicle systems 340 and, thus, may be partially or fully autonomous.

The processor(s) 310 and/or the autonomous driving system 360 can be operatively connected to communicate with the vehicle systems 340 and/or individual components thereof. For example, returning to FIG. 5, the processor(s) 310 and/or the autonomous driving system 360 can be in communication to send and/or receive information from the vehicle systems 340 to control the movement, speed, maneuvering, heading, direction, etc. of the vehicle 300. The processor(s) 310 and/or the autonomous driving system 360 may control some or all of these vehicle systems 340.

The processor(s) 310 and/or the autonomous driving system 360 may be operable to control the navigation and/or maneuvering of the vehicle 300 by controlling one or more of the vehicle systems 340 and/or components thereof. For instance, when operating in an autonomous mode, the processor(s) 310 and/or the autonomous driving system 360 can control the direction and/or speed of the vehicle 300. The processor(s) 310 and/or the autonomous driving system 360 can cause the vehicle 300 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 300 can include one or more actuators 350. The actuators 350 can be any element or combination of elements operable to modify, adjust and/or alter one or more of the vehicle systems 340 or components thereof to responsive to receiving signals or other inputs from the processor(s) 310 and/or the autonomous driving system 360. Any suitable actuator can be used. For instance, the one or more actuators 350 can include motors, pneumatic actuators, hydraulic pistons, relays, solenoids, and/or piezoelectric actuators, just to name a few possibilities.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product, which comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "a" and "an," are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for training a multi-task model deployed in a vehicle comprising:
    a processor; and
    a memory in communication with the processor, the memory having a multi-task training module having instructions that, when executed by the processor, causes the processor to:
        provide simulation training data having a plurality of samples to a multi-task model capable of performing at least a first task and a second task using at least one shared parameter of the multi-task model, wherein the plurality of samples has one or more ground truths for the first task and the second task;
        determine a first value for the first task using the simulation training data and the at least one shared parameter, the first value being one of a first gradient and a first loss,
        determine a second value for the second task using the simulation training data and the at least one shared parameter, the second value being one of a second gradient and a second loss,
        determine a task induced variance between the first value and the second value, the task induced variance $v_n(L)$ as: $v_n(L) = \text{Var}\ [\{\alpha_k L_k(x_n, y_n), k=1:K\}]$, where $\{(x_n, y_n)\}$ are the plurality of samples, and L is the loss, and
        train the multi-task model, wherein the task induced variance of the multi-task model is reduced by iteratively adjusting the at least one shared parameter of the multi-task model.

2. The system of claim 1, wherein the multi-task training module further comprises instructions that, when executed by the processor, causes the processor to determine, when the first value is the first gradient and the second value is the second gradient, the task induced variance (Var $[g_{n,1:K}]$) for each of the plurality of samples as:

$$v_n(K) = \text{Var}[g_{n,1:K}] = \frac{1}{K}\sum_{k=1}^{K} g_{n,k}^2 - \left(\sum_{k=1}^{K} g_{n,k}\right)^2$$

where n is a number of samples and g is a gradient.

3. The system of claim 1, wherein the multi-task training module further comprises instructions that, when executed by the processor, causes the processor to iteratively derive, when the first value is the first gradient and the second value is the second gradient, additive updates to the at least one shared parameter using the following:

$$g_{n,k} = \nabla_\theta L_k(x_n, y_n; \theta),$$

$$g = \nabla_\theta L = \frac{1}{N \times K}\sum_{n=1}^{N}\sum_{k=1}^{K} \alpha_k g_{n,k}, \text{ and}$$

$$\theta^{(t+1)} = \theta^{(t)} - \eta^{(t)} g^{(t)},$$

where $$\bar{g}_{n,k} = \frac{1}{\sqrt{v_n(K)}} g_{n,k},$$

$\{(x_n, y_n)\}$ are the plurality of samples, $\theta$ is the shared parameter, $\alpha$ is a task specific parameter or fixed parameter, and g is a batch level gradient.

4. The system of claim 3, wherein the multi-task training module further comprises instructions that, when executed by the processor, causes the processor to reweigh, when the first value is the first gradient and the second value is the second gradient, the batch level gradient (g) using the following:

$$\hat{g}^{(t)} = \frac{1}{\sqrt{E[v_n^{(t)}(L)]E[v_n^{(t)}(K)]}} g^{(t)}$$

where $E[v_n^{(t)}(L)] = \frac{1}{NK}\sum_{n,k}(\alpha_k L_k(x_n, y_n))^2 - L^2$, and where $E[v_n^{(t)}(K)] = \frac{1}{NK}\sum_{n,k} g_{n,k}^2 - \frac{1}{NK}\sum_{n}\left(\sum_{k} g_{n,k}\right)^2$.

5. The system of claim 1, wherein the first task is an object detection task and the second task is a depth estimation task.

6. A method for training a multi-task model deployed in a vehicle comprising the steps of:
    providing simulation training data having a plurality of samples to a multi-task model capable of performing at least a first task and a second task using at least one shared parameter, wherein the plurality of samples has one or more ground truths for the first task and the second task;
    determining a first gradient for the first task using the simulation training data and the at least one shared parameter;
    determining a second gradient for the second task using the simulation training data and the at least one shared parameter;
    determining a task induced gradient variance between the first gradient and the second gradient, wherein the variance loss $v_n(Z)$ is determined as: $v_n(L) = \text{Var}\ [\{\alpha_k L_k(x_n, y_n), k=1:K\}]$ where $\{(x_n, y_n)\}$ are the plurality of samples, and L is the loss; and
    training the multi-task model, wherein the task induced gradient variance is reduced by iteratively adjusting the at least one shared parameter of the multi-task model.

7. The method of claim 6, wherein the task induced gradient variance (Var $[g_{n,1:K}]$) is determined for each of the plurality of sample as:

$$v_n(K) = \text{Var}[g_{n,1:K}] = \frac{1}{K}\sum_{k=1}^{K} g_{n,k}^2 - \left(\sum_{k=1}^{K} g_{n,k}\right)^2$$

where, n is a number of samples and g is a gradient.

8. The method of claim 6, further comprising the step of iteratively deriving additive updates to the at least one shared parameter using the following:

$$g_{n,k} = \nabla_\theta L_k(x_n, y_n; \theta),$$

-continued $$g = \nabla_\theta L = \frac{1}{N \times K} \sum_{n=1}^{N} \sum_{k=1}^{K} \alpha_k g_{n,k}, \text{ and}$$

$$\theta^{(t+1)} = \theta^{(t)} - \eta^{(t)} g^{(t)},$$

where $$\overline{g}_{n,k} = \frac{1}{\sqrt{v_n(K)}} g_{n,k},$$

$\{(x_n, y_n)\}$ are me plurality of samples, $\theta$ is the shared parameter, $\alpha$ is a task specific parameter or fixed parameter, and g is a batch level gradient.

9. The method of claim 8, further comprising the step of reweighing the batch level gradient (g) using the following:

$$\hat{g}^{(t)} = \frac{1}{\sqrt{E[v_n^{(t)}(L)]E[v_n^{(t)}(K)]}} g^{(t)}$$

where $E[v_n^{(t)}(L)] = \frac{1}{NK} \sum_{n,k} (\alpha_k L_k(x_n, y_n))^2 - L^2$, and where $E[v_n^{(t)}(K)] = \frac{1}{NK} \sum_{n,k} g_{n,k}^2 - \frac{1}{NK} \sum_n \left( \sum_k g_{n,k} \right)^2$.

10. The method of claim 6, further comprising the steps of:
determining a first loss using a first loss function for the first task using the simulation training data and the at least one shared parameter;
determining a second loss using a second loss function for the second task using the simulation training data and the at least one shared parameter;
determining a variance loss of the first loss of the first task and the second loss of the second task; and
iteratively adjusting the at least one shared parameter to reduce the variance loss.

11. The method of claim 6, wherein the first task is an object detection task and the second task is a depth estimation task.

12. A method for training a multi-task model deployed in a vehicle comprising the steps of:
providing simulation training data having a plurality of samples to a multi-task model capable of performing at least a first task and a second task using at least one shared parameter, wherein the plurality of samples has one or more ground truths for the first task and the second task;
determining a first loss using a first loss function for the first task using the simulation training data and the at least one shared parameter;
determining a second loss using a second loss function for the second task using the simulation training data and the at least one shared parameter;
determining a variance loss of the first loss of the first task and the second loss of the second task, wherein the variance loss $v_n(Z)$ is determined as: $v_n(L)=\text{Var}\:[\{\alpha_k L_k (x_n,y_n), k=1:K\}]$, where $\{(x_n, y_n)\}$ are the plurality of samples, and L is the loss; and training the multi-task model, wherein the task induced gradient variance is reduced by iteratively adjusting the at least one shared parameter of the multi-task model.

13. The method of claim 12, further comprising the steps of: determining a first gradient for the first task using the simulation training data and the at least one shared parameter; determining a second gradient for the second task using the simulation training data and the at least one shared parameter; determining a task induced gradient variance between the first gradient and the second gradient; and iteratively adjusting the at least one shared parameter to reduce the task induced gradient variance.

14. The method of claim 13, wherein the task induced gradient variance (Var $[g_{n,1:K}]$) is determined for each of the plurality of sample as:

$$v_n(K) = \text{Var}[g_{n,1:K}] = \frac{1}{K} \sum_{k=1}^{K} g_{n,k}^2 - \left( \sum_{k=1}^{K} g_{n,k} \right)^2$$

where, n is a number of samples and g is a gradient.

15. The method of claim 13, further comprising the step of iteratively deriving additive updates to the at least one shared parameter using the following:

$$g_{n,k} = \nabla_\theta L_k(x_n, y_n; \theta),$$

$$g = \nabla_\theta L = \frac{1}{N \times K} \sum_{n=1}^{N} \sum_{k=1}^{K} \alpha_k g_{n,k}, \text{ and}$$

$$\theta^{(t+1)} = \theta^{(t)} - \eta^{(t)} g^{(t)},$$

where $$\overline{g}_{n,k} = \frac{1}{\sqrt{v_n(K)}} g_{n,k},$$

$\{(x_n, y_n)\}$ are the plurality of samples, $\theta$ is the shared parameter, $\alpha$ is a task specific parameter or fixed parameter, and g is a batch level gradient.

16. The method of claim 15, further comprising the step of reweighing the batch level gradient (g) using the following:

$$\hat{g}^{(t)} = \frac{1}{\sqrt{E[v_n^{(t)}(L)]E[v_n^{(t)}(K)]}} g^{(t)}$$

where $E[v_n^{(t)}(L)] = \frac{1}{NK} \sum_{n,k} (\alpha_k L_k(x_n, y_n))^2 - L^2$, and where $E[v_n^{(t)}(K)] = \frac{1}{NK} \sum_{n,k} g_{n,k}^2 - \frac{1}{NK} \sum_n \left( \sum_k g_{n,k} \right)^2$.

17. The method of claim 12, wherein the first task is an object detection task and the second task is a depth estimation task.

* * * * *